US005418199A

United States Patent [19]

Knauss

[11] Patent Number: 5,418,199
[45] Date of Patent: May 23, 1995

[54] REFRACTORY MIX AND SHAPES MADE THEREFROM

[75] Inventor: Richard J. Knauss, Pittsburgh, Pa.

[73] Assignee: Indresco Inc., Dallas, Tex.

[21] Appl. No.: 232,379

[22] Filed: Apr. 25, 1994

[51] Int. Cl.$^6$ ............................................. C04B 35/44
[52] U.S. Cl. ................................... 501/120; 501/104; 501/105; 501/115
[58] Field of Search ............... 501/104, 105, 115, 118, 501/119, 120, 121, 127, 153, 108, 109, 126, 102, 103; 51/309, 307, 298

[56] References Cited

U.S. PATENT DOCUMENTS

| 1,949,038 | 2/1934 | Caven . | |
|---|---|---|---|
| 2,984,576 | 5/1961 | Alexander et al. . | |
| 3,268,349 | 8/1966 | Brixner . | |
| 3,398,923 | 8/1968 | Pipitz et al. . | |
| 3,498,769 | 3/1970 | Coes | 51/298 |
| 3,514,302 | 5/1970 | Willmore et al. | 501/109 |
| 3,520,706 | 7/1970 | Davies et al. . | |
| 4,018,858 | 4/1977 | Walters et al. . | |
| 4,073,656 | 2/1978 | Gulas et al. . | |
| 4,847,222 | 7/1989 | Knauss et al. | 501/104 |
| 4,880,757 | 11/1989 | Henslee et al. | 501/104 |
| 5,021,374 | 6/1991 | Macey | 501/109 |
| 5,283,215 | 2/1994 | Hosokawa et al. | 501/120 |

Primary Examiner—Mark L. Bell
Assistant Examiner—Paul Marcantoni
Attorney, Agent, or Firm—John L. Sigalos

[57] ABSTRACT

A refractory mix made comprising magnesite having an MgO content of at least about 95 wt. % and fused spinel-zirconia grain comprising 1 to 40 wt. % zirconia and refractory shapes, particularly brick, made therefrom.

11 Claims, No Drawings

REFRACTORY MIX AND SHAPES MADE THEREFROM

BACKGROUND OF THE INVENTION

The instant invention relates to a fused refractory grain and refractory mixes and shapes made therefrom, particularly to magnesite-spinel brick.

With the phasing out of chrome-containing brick due to the toxicity problems inherent with hexavalent chromium compounds, efforts to replace the same have included magnesite-spinel brick.

Magnesite-spinel brick and other refractory shapes made from magnesite-spinel refractory mixes are in wide usage, and while generally satisfactory they have relatively low strength of about 100 to 300 psi at high temperatures, i.e., at about 2500° and above.

The low strength arises due to eutectic melting which occurs when lime and, to a lesser extent, silica within the magnesite portion of the spinel grain react with the alumina component of the spinel grain.

Efforts to increase the high temperature strengths have not been successful despite the addition of various additives.

SUMMARY OF THE INVENTION

The present invention overcomes the problems of the prior art and provides a refractory grain and mixes and shapes made therefrom which have improved high temperature strength.

More particularly, the present invention comprises a fused stoichiometric or magnesia-rich spinel grain which contains 1 to 40 wt % zirconia The invention also comprises a refractory mix for forming refractory shapes comprising magnesite having an MgO content of at least about 95 weight % and a lime content of less than about 2 wt. % and a fused spinel-zirconia grain containing 1 to 40 weight % zirconia.

The invention further relates to refractory shapes, particularly brick, formed by shaping and burning the above-noted refractory mix.

BACKGROUND OF THE INVENTION

The two essential elements of the instant invention are the utilization of a fused stoichiometric or magnesia-rich spinel-zirconia grain and a magnesite having at least about 95 weight % MgO and less than 2 wt. %, preferably less than 1 wt. % lime (CaO). It is preferred to use a deadburned magnesite.

With respect to "spinel", such term as used herein means magnesium aluminate ($MgA_2O_4$). It is preferred to use a stoichiometric spinel, one containing 27 wt. % magnesia and the balance alumina, or a magnesium-rich spinel, i.e., one containing a wt. % of magnesia greater than 27 wt. %. In the instant invention unstabilized zirconia is admixed with the alumina and with the magnesia in forming the spinel by fusion. The result is a novel fused spinel-zirconia grain which is utilized in the instant mixes.

U.S. Pat. No. 4,880,757 discloses a zirconia-containing grain, but one that is sintered and not fused. This patent also states in Col. 8, lines 3 to 12 that use of a fused zirconia grain admixed with a co-precipitated spinel resulted in a less preferred approach. Thus, in this patent, at best, only one component of the grain is fused. Moreover, in U.S. Pat. No. 4,880,757 it is stated that preferably the zirconia contains a stabilizing agent. In the instant invention an unstabilized zirconia is used and both it and the spinel discussed above are mixed together and then fused, preferably electrically fused.

While the amount of zirconia in the spinel-grain can vary widely, i.e., from about 1 to 40 weight %, for reasons of economy it is preferred to utilize about 10 weight % of zirconia in the grain.

The spinel-zirconia grain is formed by any known and available fusion process. As to the size of the grains, they can vary widely, but ordinarily the grain sizes chosen are those suitable for best performance in making brick; namely, a combination of −6 mesh and −28 mesh Tyler standard. In this application all reference to mesh sizes is to Tyler standard.

With respect to the magnesite, as noted above it must contain at least about 95 weight % MgO and preferably less than 1.5 wt. % CaO. It is preferred to use one containing 98 wt. % MgO and less than 1 wt. % CaO.

As to proportions used to make brick, it is preferred to utilize at least 60 weight % of the magnesite and the balance the fused spinel-zirconia grain, but operatively 50 to 95 weight % of the magnesite can be used with the balance the fused spinel-zirconia grain described above.

As in all refractory shape manufacture, in making the shape such as brick, there are the usual plus additions of binders such as lignosulphonates and mold release agents, such as oils, to aid in the manufacturing of the product. These are added in their usual amounts. Ordinarily in the case of the lignosulphonates or other temporary binders, at least about 2.5 weight % is added based on the total weight of the magnesite and fused spinel-zirconia grain.

In making the mix it is ordinarily desired to add sufficient spinel-zirconia grain to insure preferably that there is about 1% and preferably 5% of zirconia in the final mix.

The method of making the brick is that conventionally used. More particularly, the magnesite, the fused spinel-zirconia grain, binder, and mold release agent (oil) are thoroughly admired, formed into the desired shape as by pressing in a mold and the brick burned at the conventional magnesite brick-making temperatures of about 2700° to 3100° F.

The invention will be further described in connection with the following examples which are set forth for purposes of illustration only.

EXAMPLES 1 TO 8

A series of eight different brick were formed utilizing deadburned magnesite containing about 96 weight % MgO or deadburned magnesite containing 98 weight % MgO with fused spinel alone or a fused spinel-zirconia grain, the zirconia used being unstabilized. In some instances the fused spinel grain was admixed with baddeleyite, a naturally occurring form of zirconia. In all instances there were the usual plus additions of a binder (lignosulfonate) and oil.

All of the brick were formed in the same manner; namely, the ingredients are thoroughly admixed and pressed at 12,000 psi on a Lassman press. Those mixes containing magnesite having about 96 weight % MgO were burned at 2800° F. to avoid sticking, while those brick containing the higher MgO content; namely, 98 weight % were burned at 3050° F. The 96 grade magnesite had a CaO content of 2.3 wt. %, a silica content of 0.7 wt. %, and a lime/silica ratio of 3.2:1. The 98 grade magnesite had a CaO content of 0.7 wt. %, a silica content of 0.7 wt. %, and a lime/silica ratio of 1:1. The mix formulations are set forth in Table I below with Table II giving the chemical analysis of the fused spinel, the fused spinel-zirconia grain utilized, and the dead-burned magnesite used in the mixes.

TABLE I

| | Example No. | | | | | | | |
|---|---|---|---|---|---|---|---|---|
| | 1 | 2 | 3 | 4 | 5 | 6 | 7 | 8 |
| Mix: | | | | | | | | |
| Magnesite (96 Grade) | | | | | | | | |
| −4+10 mesh | 20% | 20% | 20% | 15% | — | — | — | — |
| −10+28 mesh | 16 | 16 | 16 | 11 | — | — | — | — |
| −28 mesh | 10 | 5 | 11 | 5 | — | — | — | — |
| Fines | 29 | 29 | 28 | 29 | — | — | — | — |
| Magnesite (98 Grade) | | | | | | | | |
| −4+10 mesh | — | — | — | — | 18% | 18% | 18% | 13% |
| −10+28 mesh | — | — | — | — | 20 | 20 | 21 | 15 |
| −28 mesh | — | — | — | — | 7 | 2 | 4 | — |
| Fines | — | — | — | — | 30 | 30 | 32 | 32 |
| Fused Spinel | | | | | | | | |
| −6+10 mesh | 10 | 10 | — | — | 10 | 10 | — | — |
| −10+28 mesh | 9 | 9 | — | — | 9 | 9 | — | — |
| −28 mesh | 6 | 6 | — | — | 6 | 6 | — | — |
| Zirconia-containing Fused Spinel Grain | | | | | | | | |
| −6+10 mesh | — | — | 10 | 16 | — | — | 10 | 16 |
| 10+28 mesh | — | — | 9 | 14 | — | — | 9 | 14 |
| −28 mesh | — | — | 6 | 10 | — | — | 6 | 10 |
| Baddeleyite | — | 5 | — | — | — | 5 | — | — |
| Plus Additions: | | | | | | | | |
| Lignosulfonate | | | | 3.7 | | | | |
| oil | | | | 0.5 | | | | |
| Zirconia | | | | | | | | |
| Content by Chemical Analysis | <0.10 | 4.96 | 2.67 | 4.28 | <0.10 | 5.16 | 2.60 | 4.40 |

TABLE II

| Chemical Analysis | Spinel Grain | Spinel-Zirconia Grain | 96 Grade Magnesite | 98 Grade Magnesite |
|---|---|---|---|---|
| (Calcined Basis) | | | | |
| Silica ($SiO_2$) | 1.15% | 0.95% | 0.7 | 0.7 |
| Alumina ($Al_2O_3$) | 64.8 | 52.78 | <0.3 | ≦0.1 |
| Titania ($TiO_2$) | 2.60 | 2.14 | <0.01 | — |
| Iron Oxide ($Fe_2O_3$) | 2.15 | 2.47 | <0.3 | ≦0.1 |
| Chromic Oxide ($Cr_2O_3$) | 0.28 | 0.12 | — | — |
| Lime (CaO) | 0.27 | 0.21 | 2.3 | 0.7 |
| Magnesia (MgO) | 28.4 | 30.99 | 96.0 (min) | 98.2 |
| Zirconia ($ZrO_2$) | — | 10.33 | — | — |
| Boron Oxide ($B_2O_3$) | 0.096 | — | 0.03 | ≦0.1 |
| Soda ($Na_2O$) | — | 0.01 | — | — |
| Total Analyzed | 99.75% | 100.00% | 100.0% | 100.0% |

The properties of the brick made with the various mixes and particularly the modulus of rupture at room temperature and at 2500° F. are set forth in Table III.

TABLE III

| | Example No. | | | | | | | |
|---|---|---|---|---|---|---|---|---|
| | 1 | 2 | 3 | 4 | 5 | 6 | 7 | 8 |
| Density at the Press, pcf: | 192 | 194 | 194 | 194 | 191 | 192 | 191 | 191 |
| Burn, °F.: | 2800° F. - 10 Hr. Hold | | | | 3050° F. - 10 Hr. Hold | | | |
| Bulk Density, pcf: | 186 | 189 | 189 | 191 | 184 | 188 | 188 | 190 |
| Apparent Porosity, %: | 15.9 | 15.9 | 15.3 | 15.0 | 16.3 | 16.0 | 14.9 | 15.2 |
| Apparent Specific Gravity: | 3.55 | 3.60 | 3.58 | 3.60 | 3.51 | 3.58 | 3.54 | 3.58 |
| Modulus of Rupture | | | | | | | | |
| At Room Temperature, psi | 740 | 710 | 820 | 960 | 570 | 770 | 770 | 1030 |
| at 2500° F., psi | 260 | 80 | 120 | 120 | 100 | 390 | 260 | 420 |
| Modulus of Elasticity (psi × $10^6$) | 1.8 | 1.7 | 2.2 | 2.3 | 1.7 | 1.8 | 1.9 | 2.5 |

It will be noted that brick made from the mix of Example 1 contained a high lime magnesite having a CaO content greater than 2% and a fused spinel. This composition had a reasonably good strength at 2500F of 260 psi. The brick of Example 2 in which zirconia was added had a much lower hot strength; only 80 psi. Example 3 shows that brick made with a spinel formed by adding unstabilized zirconia as a raw material in preparation of the fused spinel grain, in combination with a high lime deadburned magnesite, again had low hot strength. Increasing the amount of fused grain used in forming the brick (Example 4) showed no improvement in hot strength.

The brick of Example 5 were formed by using a fused spinel in combination with a low lime, less than 1%, deadburned magnesite and such brick had a hot strength of only 100 psi. As shown in Example 6 when over 5 wt. % unstabilized zirconia was added to the mix of Example 5, the resultant brick showed a large increase in hot strength, but a room temperature strength below that of the brick of Examples 3 and 4 which contained lesser amounts of zirconia. The brick of Example 7 while containing only about half the zirconia content of the brick of Example 6 nevertheless had the same room temperature strength. The brick of Example 8 while containing almost 15% less zirconia than the brick of Example 6, but zirconia in the fused grain of the instant invention, had higher room temperature and 2500oF strength.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

For example, the spinel-zirconia grain is quite refractory and may be used by itself to make a refractory object such as a slide gate. To this, small additions of magnesite, alumina, spinel, or zirconia could be added to enhance spall resistance. Since such a refractory contains no easily reduceable oxides, it can also be tar impregnated.

What is claimed is:

1. Fused spinel-zirconia grain consisting essentially of co-fused magnesia, alumina, and unstabilized zirconia, said grain containing 1 to 10 wt. % zirconia.

2. The fused spinel-zirconia of claim 1 in which the fused grain is a fused stoichiometric spinel-zirconia grain containing 27 wt. % magnesia or an alumina or magnesia-rich spinel-zirconia grain containing greater than 27 wt. % magnesia.

3. A refractory mix for forming refractory shapes comprising magnesite having an MgO content of at least about 95 wt. % and less than about 2 wt. % CaO and fused spinel-zirconia grain, said grain containing 1 to 10 wt. % zirconia, said grain consisting essentially of co-fused magnesia, alumina, and unstabilized zirconia.

4. The refractory mix of claim 3 wherein said mix contains 50 to 95 wt. % magnesite and said magnesite contains less than 1 wt. % CaO.

5. The refractory mix of claim 3 wherein said fused grain is a fused stoichiometric spinel-zirconia grain containing 27 wt. % magnesia or an alumina or magnesia-rich spine-zirconia grain containing greater than 27 wt. % magnesia.

6. The refractory mix of claim 3 wherein said magnesite is a deadburned magnesite containing less than 1 wt. % CaO.

7. A refractory shape comprising a shaped and burned refractory mix comprising magnesite having an MgO content of at least about 95 wt. % and less than about 2 wt. % CaO and fused spinel-zirconia grain, said grain containing 1 to 10 wt. % zirconia, said grain consisting essentially of co-fused magnesia, alumina, and unstabilized zirconia.

8. The refractory shape of claim 7 wherein said mix contains 50 to 95 wt. % magnesite and said magnesite contains less than about 1 wt. % CaO.

9. The refractory shape of claim 7 in the form of a brick and in which the magnesite is a deadburned magnesite containing at least about 98 wt. % MgO and less than about 1 wt. % CaO and said fused grain is a fused stoichiometric spinel-zirconia grain containing 27 wt. % magnesia or an alumina or magnesia-rich spinel-zirconia grain containing greater than 27 wt. % magnesia.

10. The refractory shape of claim 7 wherein said refractory mix consists essentially of a fused spinel-zirconia grain, said grain containing 1 to 10 wt. % zirconia, said grain consisting essentially of co-fused magnesia, alumina, and unstabilized zirconia.

11. The refractory shape of claim 10 in the form of a brick.

* * * * *